Patented Dec. 2, 1941

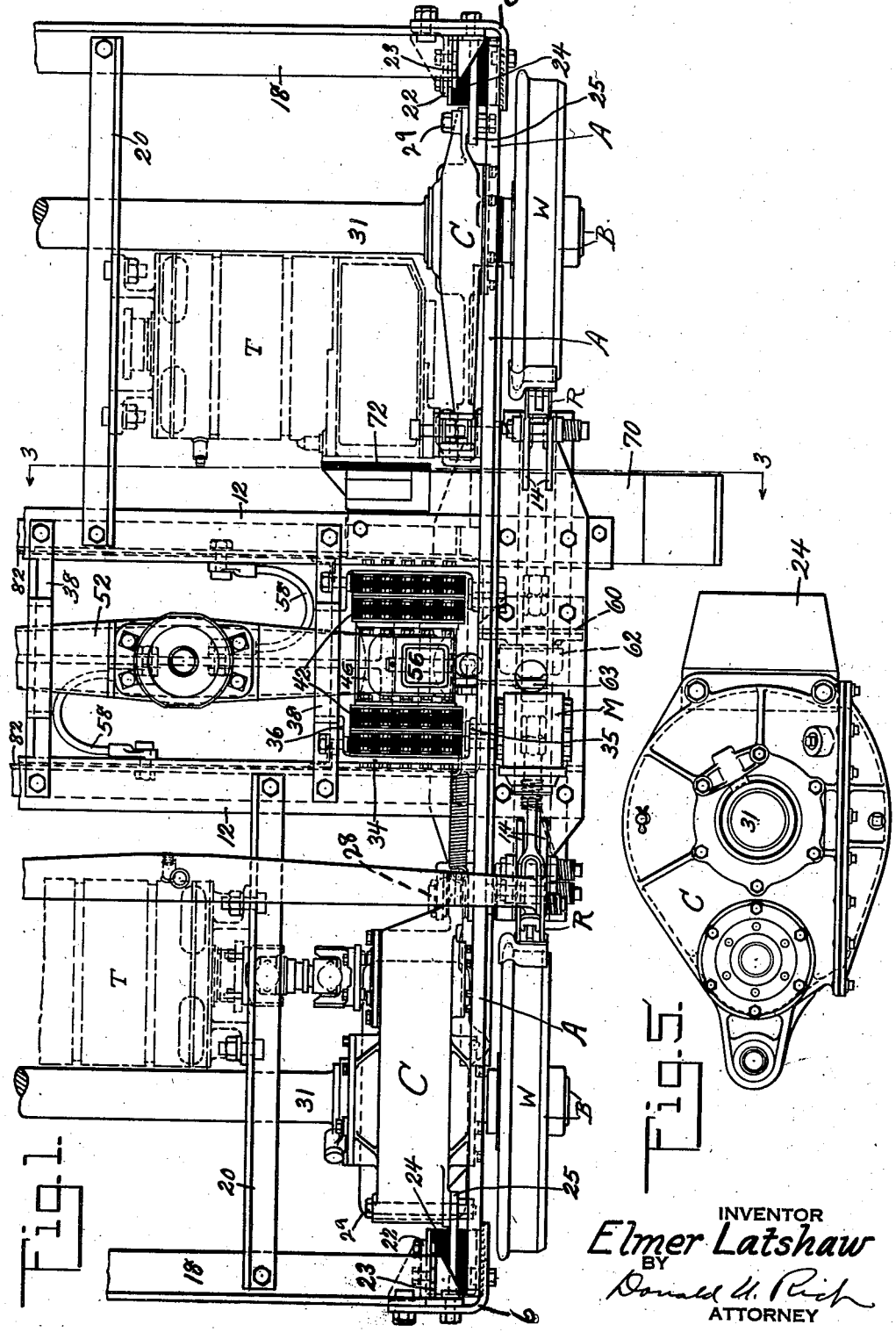
Dec. 2, 1941.  E. LATSHAW  2,264,702
LIGHTWEIGHT TRUCK
Original Filed Dec. 8, 1938  4 Sheets-Sheet 1
INVENTOR
Elmer Latshaw
BY
Donald U. Rich
ATTORNEY

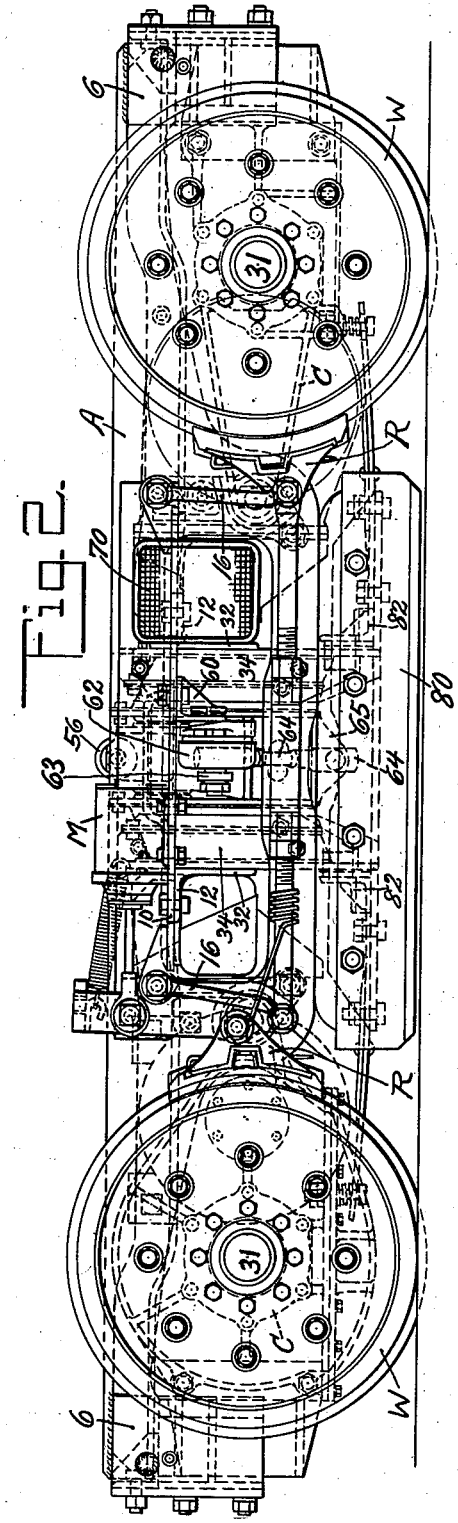

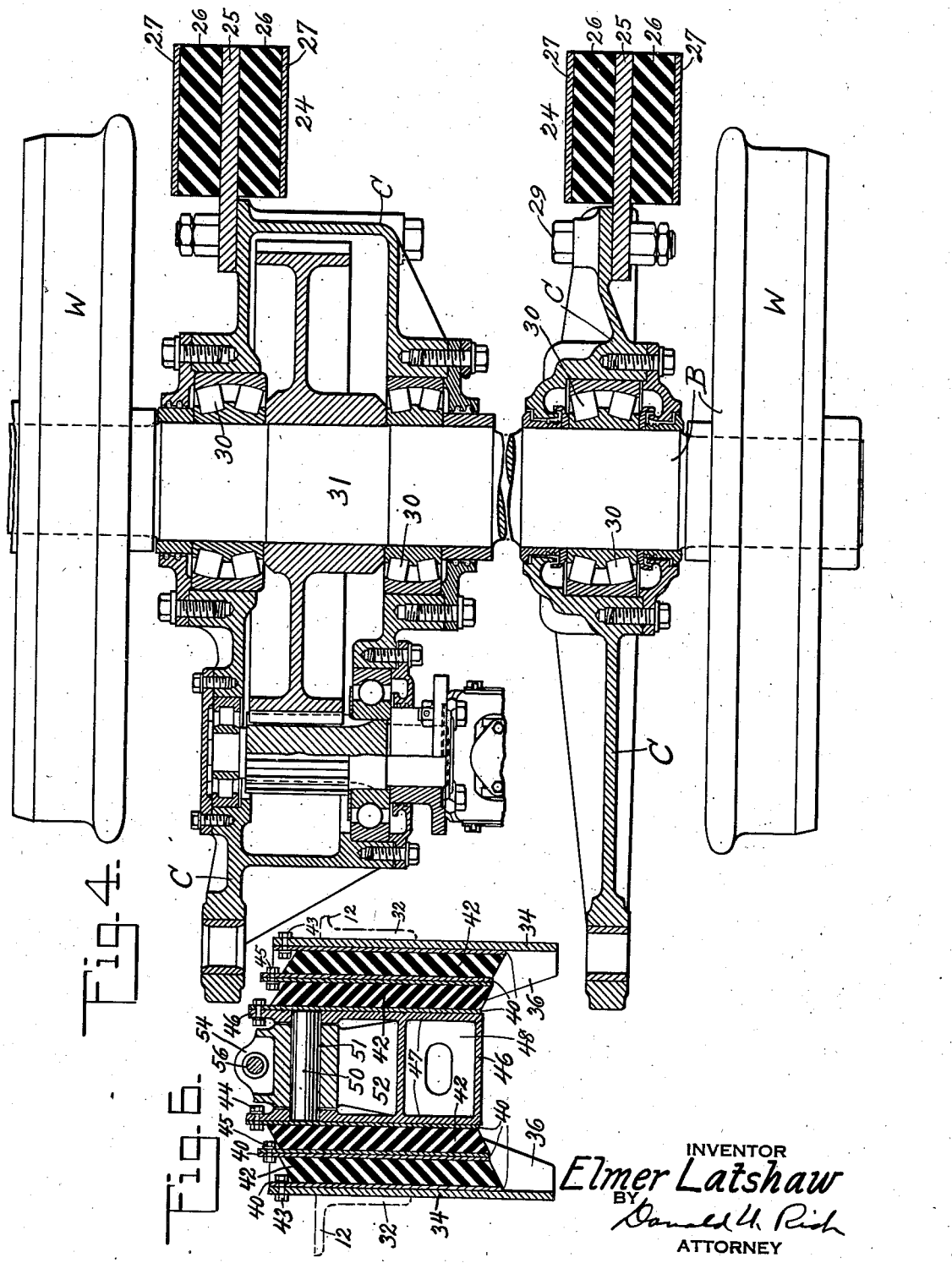

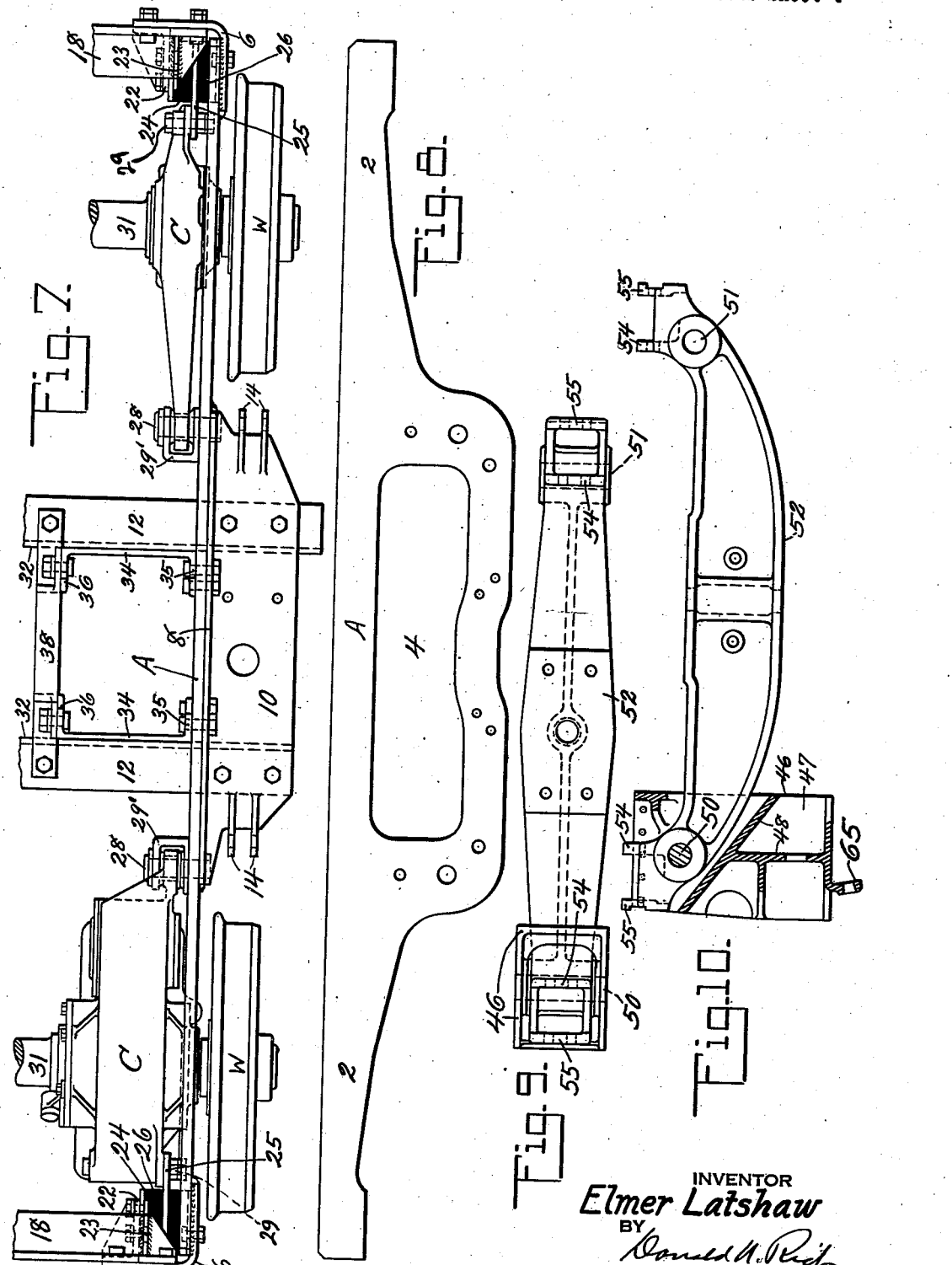

2,264,702

UNITED STATES PATENT OFFICE 2,264,702

LIGHTWEIGHT TRUCK

Elmer Latshaw, Philadelphia, Pa., assignor to The J. G. Brill Company, Philadelphia, Pa., a corporation of Pennsylvania Continuation of application Serial No. 244,662, December 8, 1938. This application April 21, 1941, Serial No. 389,649

20 Claims. (Cl. 105—185)

This invention relates to railway car trucks and more particularly to light weight trucks adapted for and intended to be used on street railways. This application is a continuation of application Serial No. 244,662, filed December 8, 1938.

It has been common practice for years in the manufacture of car trucks to use elliptic springs alone, coil springs alone or a combination of the two types of springs in attempts to secure a truck possessing easy riding qualities. In all of these trucks the frames thereof have been extremely heavy and usually were of cast metal. In the truck of the present invention one object is to provide a light weight but easy riding truck having plain one-piece pedestalless side frames cut from plate metal.

Another object of the invention is the provision of a light weight car truck resiliently supported at all necessary points by rubber units acting in shear, thus providing an extremely easy riding and substantially noiseless truck.

Still another object of the invention is the provision of a light weight car truck having a fully floating bolster, the movements of which are controlled solely by rubber units acting in shear and serving to connect the bolster to adjacent truck parts.

A further object of the invention is the provision of a light weight car truck having a fully floating bolster, the movements of which are controlled by rubber units connected thereto and to adjacent truck parts in such a manner as to cause the rubber to act in shear in resisting both vertical and lateral bolster movements.

A still further object of the invention is the provision of a light weight car truck having a fully floating bolster, the movements of which are controlled by rubber units and shock absorbers with the parts so arranged that each shock absorber damps both vertical and lateral bolster movements.

A still further object of the invention is the provision of a light weight railway car truck having a fully floating bolster supported solely by rubber in shear units directly connected to the bolster and to adjacent truck parts, the rubber units being so formed as to act in shear in resisting both vertical and lateral bolster movements.

Another object of the invention is the provision of a light weight railway car truck having a bolster, the end portions of which are hingedly connected to the intermediate portion on axes parallel to the longitudinal axis of the car truck and which said end portions constitute support members to which rubber shear units are connected; the rubber in shear units being also connected to adjacent truck parts and constituting the sole support for the bolster.

Other objects and advantages of this invention will be apparent to those skilled in the art and a study of the following description and accompanying drawings, in which:

Figure 1 is a plan view showing substantially one-half of the improved truck;

Figure 2 is an elevational view of the truck shown in Fig. 1;

Figure 3 is a sectional view taken substantially on line 3—3 of Fig. 1 and further showing the relation between the truck and the car body;

Figure 4 is a sectional view taken substantially in the plane of the axles and showing the mount for each axle;

Figure 5 is an elevational view of the combined gear box and axle control unit;

Figure 6 is a sectional view taken substantially on line 6—6 of Figure 3 and showing the connection between the bolster and rubber units;

Figure 7 is a plan view of the truck similar to that shown in Fig. 1 but with parts removed in order to more clearly show the skeleton truck;

Figure 8 is an elevational view of the truck frame prior to attachment of any fixtures;

Figure 9 is a plan view of the improved bolster with one of the floating bolster control supports attached thereto, and Figure 10 is an elevational view of the bolster shown in Fig. 9 with parts of the floating bolster control support broken away to more clearly disclose the interior construction.

Referring now more particularly to the drawings, the truck of the present invention is formed by side frames A connected together to form a more or less rigid truck supported upon wheel and axle assemblies B by means of control arms on bearing units C. The side frames are formed from flat plate cut to the shape more clearly shown in Figure 8; that is, the plate is cut to provide end portions 2 extending in opposite directions from a central portion in which opening 4 is cut. In the manufacture of the side frames the plate is preferably flame cut and after cutting a plurality of openings are drilled therein for attachment of truck parts later to be described. The cut and prepared side frames have angle shaped end pieces 6 welded or otherwise secured to the end portions of the arms 2 while an angle 8 is welded to the central part of each side frame adjacent the upper portion of the window opening 4 and in such a position that the outturned leg 10 of said angle 8 is located slightly below the upper edge of the window opening. Extending between and connecting the side frames are spaced angle shaped central cross ties or transoms 12 with their upper flanges directed away from each other and securely fastened to the flange 10 of the before mentioned angles 8. It will thus be seen that the side frames are securely tied together adjacent the central portion of the truck and the angles 8 constitute reinforcing members for the side frames. The outturned legs 10 of the angles 8 provide supports for brake cylinders M, and further, at each end thereof, the legs 10 have a pair of upstanding plates 14 welded thereto thereby providing pivotal mounts for brake hangers 16 which support any suitable type of wheel brake mechanism R.

The side frames are connected at their end portions by end cross ties 18 secured to the inturned legs of the angle end pieces 6. As additional means for stiffening the frame longitudinally extending angles 20 are provided which are secured to the end cross ties 18 and the cross ties 12, as clearly shown in Fig. 1, these angle members 20 providing supports for the motors T. Angle members 22 are secured to the end connection angles 6 and are arranged in spaced relation to the side frames, as shown in Figures 1 and 7, to provide pockets in which rubber units 24 are arranged. The end portions of the cross ties 18 are reinforced by gussets 23, welded or otherwise secured to the ties 18 above the pockets. The rubber units 24 each consists of a central plate 25 having rubber blocks 26 vulcanized to the opposite faces thereof; the outer surfaces of said blocks being vulcanized to metallic attaching plates 27 adapted to be secured in any suitable manner to the angles 22 and to a leg of the end connection angle 6 within said pocket, all as clearly shown in Figures 1 and 2. In the instance shown, the rubber units 24 are connected to adjacent parts by bolts but this is merely by way of example. A central plate 25 of each unit is extended and connected to the outer end of the adjacent axle control arm C by means of a pin or bolt 29 (see Figure 4) while the inner end of the control arm is pivotally connected to the side frame by a pin 28 extending through the side frame and through a yoke member 29' welded or otherwise secured to the side frame (see Figure 7). The intermediate portion of each axle control arm is provided with an opening for the reception of anti-friction bearings 30 and axle 31 supported by wheels W, preferably of the resilient or sound deadening type. From the above description it will be apparent that a skeleton truck is provided of extremely light construction formed of standard angle sections, bent angles and cut plates suitably tied together and supported upon wheels and axles through control arms and rubber units loaded in shear. Attention is directed to the fact that with such a construction various sizes and types of trucks may be readily built without the necessity for modification of any dies or patterns, thus materially reducing the cost of the truck.

As clearly shown in Fig. 1, the cross ties 12, and more particularly the downwardly directed flanges 32 thereof (see Figure 3) provide a space within which a bolster 52 is arranged. As shown more clearly in Figures 1 and 7 channels 34 are secured to the side frame A by suitable fasteners such as bolts or the like extending through the outer flanges 35 of said channels and through the side frame, and by welding or otherwise securing the webs of the channels to the angle cross ties 12. The inner flanges 36 of the channels 34 are secured to longitudinally extending ties 38 which join the central cross ties or transoms 12 together inwardly of the side frames and prevent any spread of the cross ties 12. The channels 34 are of sufficient length to have their upper edges substantially in alinement with the upper edge of the truck frame, and said channels extend downwardly sufficiently close to the horizontal plane of the track rails to provide guide elements for track brake means later to be referred to.

As shown clearly in the drawings, particularly in Figures 1 and 6, the bolster is supported and floated by means of rubber in shear bolster support units formed by vulcanizing metallic plates 40 to rubber blocks 42 and then connecting as many of these units together as is necessary to give the desired resiliency. In the instance shown, two units are used on either side of the bolster and the metal plates of each unit are extended sufficiently to permit the attachment of one of the plates to the web of the channel guide member as at 43, while another plate is attached as at 44 to a bolster support member 46, and the other plates which are in abutment are attached together as at 45. Although the bolster is shown as supported by a pair of units on either side thereof acting in shear, it is obvious that such an arrangement may be modified by use of more individual units or, if desired, a single block of rubber and a pair of plates may be used, such modifications depending upon the degree of resiliency desired and the load to be carried.

As shown in Fig. 10, the bolster support member 46 is formed by two side pieces 47 connected together by webs 48, one of which is inclined in order that the end portion 46 may have movement relative to the car body. The sides of the bolster support members are thickened adjacent their upper edges and drilled in order to provide bearings for pins 50 by which the bolster support members are hingedly connected to the bolster as at 51. The ends of the bolster are provided with upstanding inner and outer ears 54 and 55, which ears are pierced to receive a pin on which rollers 56 are mounted to provide truck side bearings. As is conventional, the bolster is provided with an opening adapted to receive a king pin (not shown) by which the car body may be attached to the bolster. Due to the arrangement of the rubber in shear units on opposite sides of the end portions of the bolster, the bolster is completely insulated from the remainder of the truck and since it floats relative thereto, it is necessary that electrical connections be provided. To this end flexible cables 58 are provided having their ends anchored to the bolster and to the central cross ties or transoms 12 of the truck frame, thus the car body is grounded through the bolster, electrical connections, truck frame, control arms and wheels and axles to the rails. From the above description it will be apparent that the present invention contemplates the provision of a three-parts bolster having a main body portion hingedly secured in the end portions or support members of the bolster on axes parallel to the longer axis of the truck; the bolster being wholly supported by means of resilient units interposed between opposite sides of the end portions of the bolster and adjacent truck parts and comprising rubber loaded in shear. It will also be apparent that the end portions 46 of the bolster constitute support members for the intermediate portion of the bolster and, in fact, the entire bolster.

The outstanding flange 10 of the truck angle 8 is pierced intermediate the extensions of the central cross ties 12 in order to receive a short connection angle 60 (see Figures 2 and 3) one leg of which is directed downwardly for reception and attachment of the base plate of a shock absorber 62. Shock absorber arm 63 extends inwardly and is connected by link 64 through a ball and socket connection to a lug 65 formed integral with the lower central portion of the bolster end portion 46. The shock absorber arm connecting link and point of attachment between the link and bolster end portion 46 are so arranged that the shock absorber will function to check not only vertical motion of the bolster but also lateral motion thereof as will be more clearly pointed out hereinafter.

The motors are carried by the truck frame in a manner such as hereinbefore described and are ventilated by means of a box like member 70 carried by the truck with its inner end portion connected through a gasket 72 to the traction motor while the outer end portion extends a considerable distance laterally of the truck frame, as clearly shown in Figure 3, into close proximity with the skirt V forming the lower extension of the car body side wall. The skirt V is provided with louvres in order to permit entrance of air to the motor ventilator and although no connection has been shown between the ventilator box and the louvres, it is obvious that if desired a flexible connection may be provided to connect the two and thus positively insure passage of clean air to the motors while permitting swinging motion of the truck.

In order to relieve the truck supporting rubber units from excessive strain and to substantially eliminate heating of the wheels during deceleration, a track brake is provided. In the present instance this track brake consists of shoes 80 located at either side of the truck and connected together by angle structures 82 supported and guided in part by the lower portions of the guide channels 34. The shoes and connecting structures are resiliently supported by means of leaf springs from the axle control arms and are normally held raised above the rail but upon application of an electric current to coils in the shoe they are drawn down upon the rail, thus effecting braking of the vehicle. A further detailed description of the brake and its supporting mechanism is not given here since this forms the subject matter of U. S. patent to Elmer Latshaw No. 2,207,295, granted July 9, 1940, on an application filed December 8, 1938, Serial No. 244,663.

It will be seen from the preceding description of the truck that the same may be readily fabricated from plate and rolled sections properly fastened together to form a skeleton frame, after which the assembled wheels and axles and axle control arms may be connected to the truck frame by insertion of the pins 28 and attachment of the rubber shear units at the opposite ends of the axle control arms C. The bolster may be inserted between the inner plates of the bolster rubber supporting means which have previously been attached to the truck frame, or, as is obvious, the bolster rubber support blocks may be attached to the end portions 46 of the bolster and the entire assembly then inserted between the channel guides 34, but in any case the rubber units should be placed under sufficient pre-compression as to eliminate the possibility of the vulcanized faces being placed under tension. In the present instance, and for the car as built, it was found desirable to place these rubber shear units constituting the bolster supporting means under a total pre-compression of 8000 lbs. per unit, which pre-compression was resisted by the attachment of the transoms 12 to the side frames and by the tie 38 connecting the transoms 12 together.

The operation of the truck during service is believed obvious, but a brief description thereof is here given. Assuming a vertical application of load to the truck bolster, it will be seen that the end portions 46 of the bolster will move downwardly in a vertical plane causing the rubber units 42 to act in shear to resist such movement. The end portions 46 of the bolster constitute bolster support castings as will be apparent and the load will be transferred from the bolster through the side frames to the pins 28 and rubber units 26, with the latter acting in shear to resist the load. In case a horizontal load or lateral shock is applied to the bolster the end portions will move outwardly at their upper ends, while the lower ends will tend to move inwardly, that is, the bolster support members 46, when subjected to pure horizontal load will tend to rotate about an imaginary axis substantially coinciding with the neutral axis of the stressed rubber units. Such rotational movement of the bolster support members 46 will cause the lug 65 at the lower end thereof to move either inwardly and downwardly or outwardly and upwardly, depending upon which direction the thrust is applied, but in either event the movement of the lug 65 causes a movement of the shock absorber arm and any movement of said arm will cause the shock absorber to function and check the return movement of the bolster support member 46. It is, of course, obvious that under the vertical application of load with the portion 46 of the bolster and the lug moving downwardly, the shock absorber will also be brought into play. Thus it can be seen that the shock absorber is so connected as to function to resist abnormal bolster movements, whether they be due to vertical or horizontal loading. It will also be obvious that any combination of vertical and longitudinal loading will cause functioning of the shock absorber. With the rubber in shear units 42 loaded only by a vertical load they may be considered as acting in straight line shear, while if the units are subjected to longitudinal loading, then they will act in what may be termed torsional shear. It is, of course, very seldom that the units will be subjected during service to either vertical or longitudinal loading but will be subjected to varying combinations of the two, in which case the shear action might be more properly referred to as pure V-type shear, that is, under certain conditions of vertical and longitudinal loading the stresses will be so combined as to cause the bolster support members 46 to rotate about a point adjacent the lower corner thereof. When the bolster is subjected to longitudinal loading in the fore and aft direction, such as during acceleration and deceleration periods, the rubber units would be compressed on one side of the bolster to resist such loading and it is particularly necessary during such periods that the pre-compression be sufficient to eliminate any possibility of the pre-compression load being removed from the unit on the side remote from that receiving the longitudinal loading. It will also be apparent that at certain periods the rubber units will be subjected to longitudinal loading in two directions as well as to vertical loading and since the unit will resist loading in three directions it can be seen that the bolster is universally mounted on the truck or floats relative to the truck under control of the rubber units with the shock absorber acting to control the bolster following its movement by the vertical and at least one horizontal load application.

While the construction and arrangement of parts of the truck of the present invention has been described more or less in detail, it is obvious that various changes in the form and proportions of the structure may be made within the scope of the appended claims without departing from the spirit of the invention.

What is claimed is:

1. In combination in a truck having wheel and axle assemblies in spaced relationship, connected side frames, means connecting said assemblies and side frames for relative movement, said means being connected to said side frames at least in part by resilient units, a substantially floating bolster movable relative to said side frames, bolster support members movably connected to each end of said bolster, resilient units connecting said bolster support members to said side frames, each of said resilient units acting in straight line shear to control relative vertical movements of the associated parts, and said last named resilient units also acting in torsional shear to control rotational movement of said bolster support members caused by lateral movement of the bolster in a horizontal direction transversely of the truck, and shock absorber means carried by said frames and connected to said bolster support members for further controlling the vertical and horizontal movements of said bolster.

2. In combination in a truck having wheel and axle assemblies in spaced relationship, side frames supported upon the wheel and axle assemblies, a truck bolster, bolster support members connected to said bolster for relative rocking movement, means connecting said bolster support members and side frames together, said means consisting at least in part of resilient units so formed and arranged as to control all movements of said bolster support members, and shock absorber means connected to said frames and bolster support members, said shock absorber means being so formed and arranged as to additionally control all vertical and lateral movements of the bolster.

3. In combination in a truck having wheel and axle assemblies in spaced relationship, side frames supported upon the wheel and axle assemblies, bolster support members adjacent each side frame, means connecting said bolster support members and side frames, said means consisting at least in part of rubber shear units, a bolster hingedly connected to said support members whereby bolster movements laterally of the truck are controlled by torsional shear in said rubber shear units, and shock absorber means carried by the side frames and connected to said bolster support members for additionally controlling said bolster lateral movements.

4. In combination in a truck having wheel and axle assemblies in spaced relationship, side frames supported upon the wheel and axle assemblies, floating bolster means, connecting means joining said floating bolster means and side frames, said connecting means consisting at least in part of rubber shear units controlling the vertical and lateral movements of said floating bolster means, shock absorbers connected to the side frames and to said floating bolster means for additionally controlling the vertical and lateral movements of said floating bolster means, and a bolster pivotally connected at its ends to said floating bolster means.

5. In a railway car truck, bolster support members, resilient units connected to said members and to the adjacent truck parts for controlling all the movements of said members relative to the adjacent truck parts, a bolster pivotally connected to said support members, and a shock absorber connected to each of said members and additionally controlling both vertical and lateral movements of said bolster.

6. In a railway car truck the combination of spaced apart metal side frames, connecting means joining said side frames to form a skeleton truck, a track brake carried by said truck, vertically extending angle form members connected to said side frames and said connecting means, bolster support members, resilient means connecting said bolster support members and angle form members, and a bolster movably connected at its ends to said bolster support members, said angle form members being extended downwardly and serving as a guide and stop for said track brake.

7. In a railway car truck the combination of spaced apart metal side frames, connecting means joining said side frames to form a skeleton truck, a track brake carried by said truck, vertically extending angle form members connected to said side frames and said connecting means, bolster support members positioned between said vertically extending angle form members, a bolster pivotally connected to said bolster support members, and resilient means connected to said bolster support members and angle form members and acting in torsional shear to resist lateral bolster movements, said angle form members being extended downwardly below said bolster support members and also serving as a guide and stop for said track brake.

8. In a railway car truck the combination of spaced apart metal side frames, connecting means joining said side frames to form a skeleton truck, a track brake carried by said truck, vertically extending angle form members connected to said side frames and said connecting means, bolster support means positioned between and in spaced relation to said angle form members, a bolster pin connected to the upper portions of said bolster support members, and resilient means connecting said bolster support members and angle form members together and acting in shear to resist all vertical and lateral movements of the bolster, said angle form members being also extended downwardly below the bolster support members to provide portions serving as guides and stops for said track brake.

9. In combination in a railway car truck, spaced wheel and axle assemblies, side frames supported by said assemblies, bolster support members adjacent the side frames, a truck bolster having its end portions extending into and pivotally connected with said support members, and means supporting said bolster comprising resilient units interposed between and connected directly to said support members and adjacent truck parts and so formed and arranged as to be subjected to shearing action in service.

10. In combination in a railway car truck, a truck frame, wheel and axle assemblies for supporting said frame, a truck bolster, spaced bolster supporting elements, pivot means connecting said bolster at its end portions to said supporting elements on axes parallel to the longitudinal axis of the truck frame to permit rocking movement of the bolster transverse to the truck frame, and resilient means interposed between and directly connecting the support members to adjacent truck frame parts so formed and arranged as to act in shear in resisting relative movement of the truck frame and bolster.

11. In combination in a railway car truck, a truck frame, wheel and axle assemblies for supporting said frame, a truck bolster, spaced bolster supporting elements, pivot means connecting said bolster at its end portions to said supporting elements on axes parallel to the longitudinal axis of the truck frame to permit rocking movement of the bolster transverse to the truck frame, and resilient means interposed between and directly connecting the support members to adjacent truck frame parts so formed and arranged as to act in shear in resisting relative movement of the truck frame and bolster, said resilient means constituting the sole support for said bolster and bolster supporting elements.

12. In combination in a railway car truck, a truck frame, wheel and axle assemblies supporting said frame, spaced bolster support members, spaced rubber shear units interposed between and directly connecting the support members and adjacent truck frame parts, and a bolster extending between the support members and pivotally connected thereto at its end portions and intermediate said shear units on axes parallel to the longer dimension of the truck frame.

13. In combination in a car truck having wheel and axle assemblies in spaced relationship, side frames supported by said assemblies, a bolster support member adjacent each side frame, means connecting said bolster support members and side frames together, said means consisting at least in part of rubber shear units, and a bolster hingedly connected directly to said support members in such a manner that bolster movements laterally of the truck are controlled by torsional shear in said rubber shear units.

14. In combination in a car truck having wheel and axle assemblies in spaced relationship, side frames supported by said assemblies, a bolster support member adjacent each side frame, means connecting said bolster support members and side frames together, said means consisting at least in part of rubber shear units, and a bolster having its end portions extended into and hingedly connected with said support members in such a manner that bolster movements laterally of the truck are controlled by torsional shear in said rubber shear units.

15. In combination in a railway car truck having spaced wheel and axle assemblies, side frames supported by said assemblies, bolster support members, a truck bolster hingedly connected to said support members at spaced points on its longitudinal axis, and means supporting said bolster and bolster support members comprising rubber units interposed between and connecting the bolster support members and side frames and so formed and arranged as to be subject to shear action in service.

16. In combination in a railway car truck having spaced wheel and axle assemblies, side frames supported upon said assemblies, a bolster support member adjacent each side frame, means connecting said side frames and bolster support members comprising rubber shear units interposed therebetween and connected to said side frames and support members, and a bolster hingedly connected directly to said support members at spaced points on its longitudinal axis.

17. In combination in a railway car truck having spaced wheel and axle assemblies, side frames supported upon said assemblies, a bolster support member adjacent each side frame, means connecting said side frames and bolster support members comprising rubber shear units interposed therebetween and connected to said side frames and support members, and a bolster hingedly connected directly to said support members in such a manner that bolster movements laterally of the truck are controlled by torsional shear in said rubber units.

18. In a railway car truck, bolster support members, resilient units connected to said members and adjacent truck parts, and a bolster hingedly connected directly to said support members for relative rotational movement whereby lateral motion of said bolster will cause rotational movement of said support members which movement will be resisted by said resilient units acting in torsional shear.

19. In a railway car truck, bolster support members, resilient units connected to said members and adjacent truck parts, and a bolster hingedly connected directly to said support members for relative rotational movement whereby lateral motion of said bolster will cause rotational movement of said support members which movement will be resisted by said resilient units acting in torsional shear, said resilient units constituting the sole support for said bolster and bolster support members.

20. In a railway car truck, bolster support members, resilient units connected to said members and adjacent truck parts for controlling movements of said members, and a bolster hingedly connected directly to said support members at the upper portions thereof whereby lateral motion of the bolster will cause rotational movement of the bolster support members, said resilient units comprising rubber elements so formed and arranged as to resist said rotational movement of the bolster support members in torsional shear.

ELMER LATSHAW.